Patented Nov. 28, 1922.

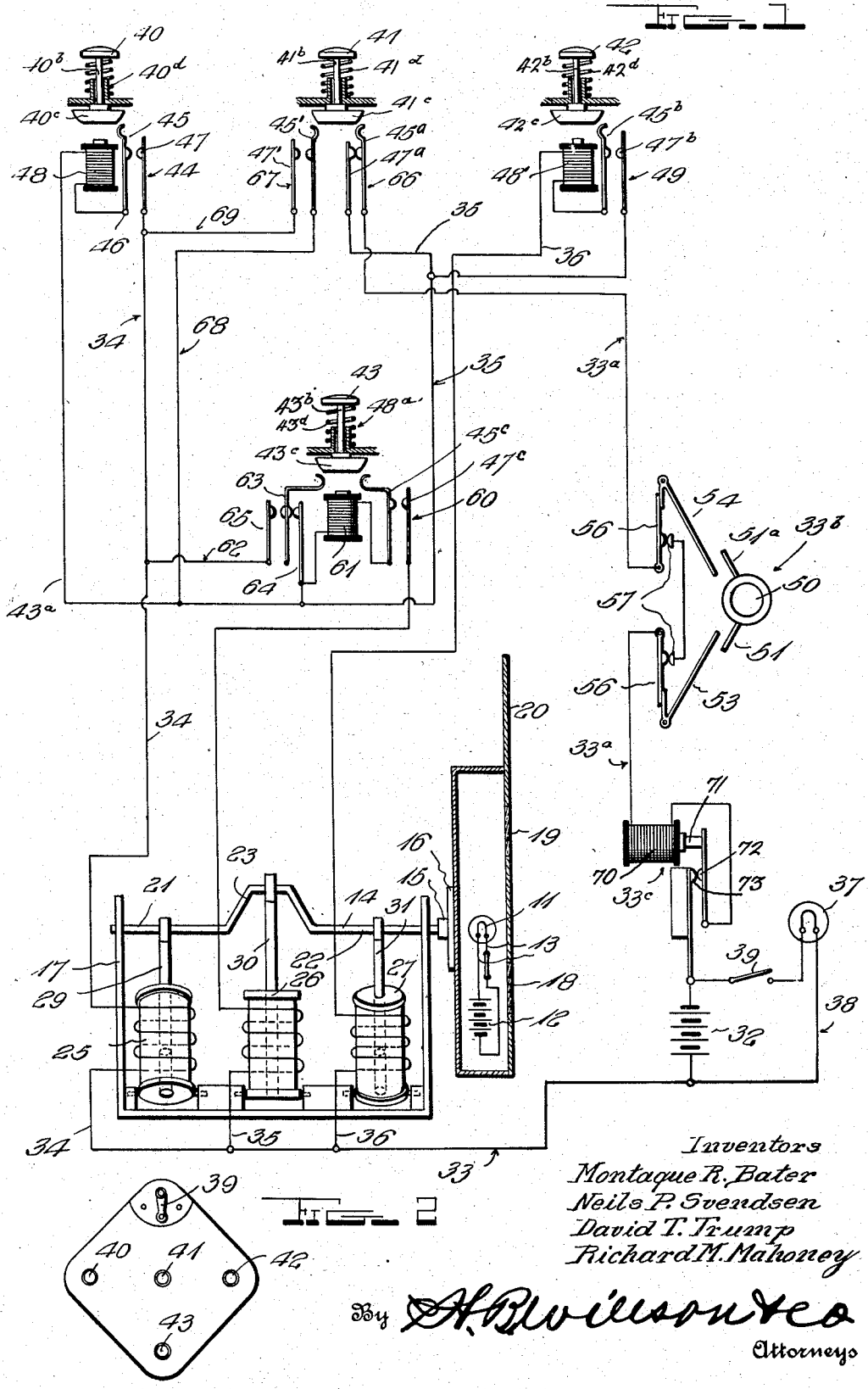

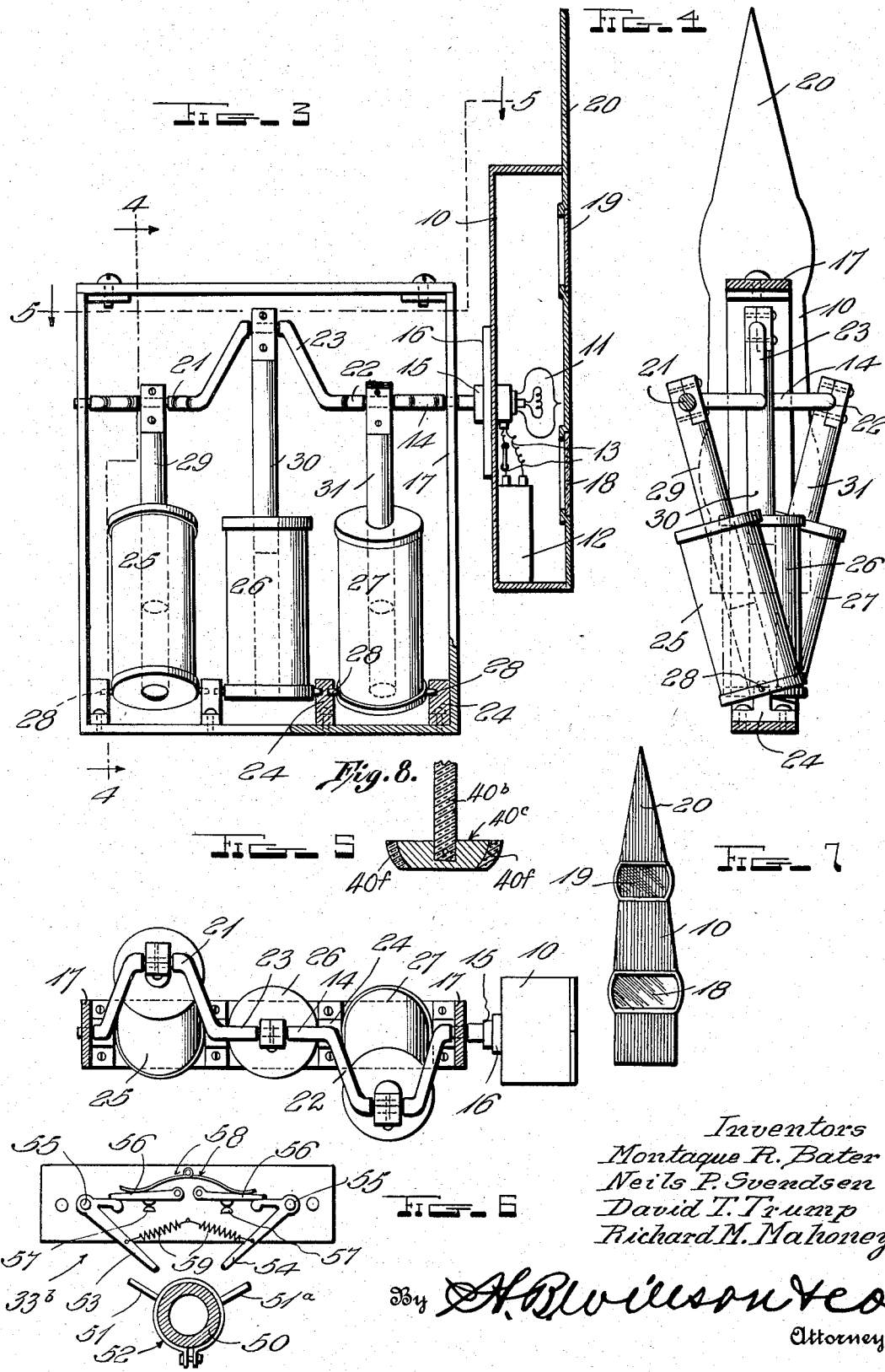

1,437,086

UNITED STATES PATENT OFFICE.

MONTAGUE R. BATER, NIELS P. SVENDSEN, DAVID T. TRUMP, AND RICHARD M. MAHONEY, OF CALGARY, ALBERTA, CANADA.

ELECTRICALLY-OPERATED SIGNAL FOR AUTOMOBILES.

Application filed October 7, 1918. Serial No. 257,244.

*To all whom it may concern:*

Be it known that we, MONTAGUE R. BATER, NIELS PETER SVENDSEN, DAVID T. TRUMP, and RICHARD M. MAHONEY, subjects of the King of Great Britain, residing at Calgary, in the Province of Alberta, Dominion of Canada, have invented certain new and useful Improvements in Electrically-Operated Signals for Automobiles; and we do declare the following to be a full, clear, and exact description of the invention, such as will enable others skilled in the art to which it appertains to make and use the same.

This invention relates to signals, and it relates more particularly to an improved electrically operated signal for automobiles.

One object of this invention is to provide an improved signaling device which is attachable to the rear end of an automobile and operable to indicate the intention of the operator of turning to the right or left, or to stop the automobile, thereby giving warning to persons following in the rear of the automobile, and thus greatly reducing the danger of rear end collisions;

Another object is to provide a device of this character which is attachable to the front end of an automobile so as to warn pedestrians and others ahead of the automobile that it is about to turn to the right or left;

Another object is to provide a device of this character which is electro-mechanically controlled so that the operator's hands and feet are left free to actuate the steering, braking and other controlled mechanisms of the automobile;

Another object is to provide means whereby the signaling element is automatically freed from its signaling positions, and allowed to return to its normal position, by the operation of turning the steering mechanism while turning a curve;

Another object is to provide a device of this character in which the electric circuit is automatically broken in case the operator neglects to break the same after using it.

Other objects and advantages may become apparent to persons who read the following details of description in connection with the accompanying drawings in which:

Figure 1 is a diagrammatic view which illustrates the electrical conductors and their connections with the mechanical elements which move the signaling element to its different signaling positions;

Fig. 2 is a view illustrating the switch board detached;

Fig. 3 is a side elevation of the signaling device and its supporting and operating devices;

Fig. 4 is a vertical sectional view along the line 4—4 of Fig. 3;

Fig. 5 is a horizontal sectional view along the line 5—5 of Fig. 3;

Fig. 6 is a detail view, partly in section, illustrating the means whereby the steering shaft operates a make-and-brake mechanism which controls the signaling element;

Fig. 7 is a detail view and elevation, showing the preferred embodiment of the signaling device to be used in connection with the other features of this invention; and Fig. 8 is an enlarged detail sectional view of one of the armatures 40° and its adjuncts.

Referring to these drawings in detail, in which similar reference characters correspond with similar parts throughout the several views, we have illustrated a signaling device which is more especially intended for application to the rear end of an automobile, for indicating whether the automobile is going to stop or turn rightward or leftward, and the preferred form of signaling element, as illustrated in Figs. 3 and 7, consists of a casing 10 which is provided with an electric lamp 11, a battery 12 and conductors 13 which connect the lamp with the battery. This feature, however, may be substituted by any other appropriate means of supplying light for the signaling element. The bottom portion of the casing 5 is considerably heavier than its top portion, especially in view of the added weight of the battery 12, and the casing is pivotally supported on a crank shaft 14 through the medium of a hub member 15 which is provided with flanges 16 secured to the rear or inner wall of the signaling element. The shaft 14 is journaled in opposite walls of the frame 17 and cooperates with the latter for pivotally supporting the said signaling element, so that the latter normally stands in the vertical position shown in Figs. 3, 4 and 7. The front of the casing is preferably red with the exception of a clear glass or lens 18. A red lens 19 is arranged in said front wall above the clear glass and above the lamp 11, and the remainder of the said front wall is preferably opaque. Extending above the front wall of the casing is a pointed finger 20 which is also preferably red and opaque and serves to indicate the direction in which the automobile is about to turn.

The crank shaft 14 is provided with a leftwardly extending crank 21, a rightwardly extending crank 22 and an upwardly extending crank 23. That is, the cranks 21, 22 and 23 extend leftward, rightward and upward when the device is in its normal or non-signaling position. The cranks 21 and 22 preferably lie in the same horizontal axial plane, while the crank 23 extends in a vertical axial plane or at right angles to the axial plane of the other cranks.

At the bottom of the frame 17 is a plurality of bearings 24, and a plurality of cylinders 25, 26 and 27 are pivotally mounted at 28, or journaled in the bearings 24. Each of these cylinders is wound with a coil of conducting wire so as to constitute a magnetic coil. A plurality of metal rods or armatures 29, 30 and 31 are journaled respectively on the cranks 21, 23 and 22, and these armatures extend respectively into the cylinders or magnetic coils 25, 26 and 27, and combine therewith to form three solenoids. It will be seen, therefore, that when one of these solenoids is energized, its armature will be drawn downward, and the contiguous crank will be drawn downward thereby, so that the crank shaft will be rotated rightward or leftward according to which one of the solenoids is energized. However, the crank 23 effects substantially a half revolution of the shaft 14, whereas the cranks 21 and 22 effect only a quarter revolution respectively, as will be explained more fully hereinafter.

Referring now to Figs. 1 and 8, it will be seen that the coils 25, 26 and 27 may be energized by means of a storage battery 32, through the medium of the electric circuit which will now be described in detail:

A main conductor wire 33 connects with the storage battery 32 and supplies current to the solenoids through the parallel connections or conductors 34, 35 and 36. These parallel conductors connect the solenoids in parallel with one another, and a main conductor $33^a$ has a switch mechanism $33^b$ interposed therein, and also has interposed therein a thermostatic relay $33^c$. This relay may be of any appropriate construction and is intended to automatically break the main circuit after it has been closed a predetermined length of time. The relay here illustrated includes a heating coil 70, wound around an expansible rod 71 which operates to open a switch which comprises a movable contact 72 and a stationary contact 73. The battery may be the same as that which is employed for lighting the dash-lamp, the latter being indicated at 37, and the current being supplied through a conductor 38 which has a switch 39 interposed therein.

Referring now to Fig. 2 in connection with Figs. 1 and 8, it will be seen that four push-buttons or keys 40, 41, 42 and 43 are employed to regulate the circuit through the medium of special switch mechanisms which will be described in connection with these keys respectively:

These keys are provided with heads or finger pieces to which the numerals 40, 41, 42 and 43 are applied, respectively, these keys having stems $40^b$, $41^b$, $42^b$ and $43^b$, respectively, and downwardly converging feet $40^c$, $41^c$, $42^c$ and $43^c$, respectively, springs $40^d$, $41^d$, $42^d$ and $43^d$ surround the stems of the respective keys and press them outward and hold them in their respective normal or inoperative positions. The feet or armatures are provided with an insulating element $10^e$ (see Fig. 8) which contact with the respective switch elements 45, $45'$, $45^a$, $45^b$, $45^c$ and 63.

The conductor 34 is connected with a conductor $43^a$ through the medium of a switch mechanism 44 which includes a switch arm 45, which is preferably of spring material and has one end fixed at 46; a fixed contact 47 connected to the conductor 34; and an electromagnet 48 interposed in the conductor $43^a$. It will be seen that when the key 40 is depressed the downwardly converging side of the foot $40^c$ presses the switch arm 45 laterally and causes its contact element to press against the contact element 47 and thereby close the circuit between the conductors $43^a$ and 34. It will be seen that current now flows from the battery 32 and passes through the relay $33^c$, conductors $33^a$ and 35 (including the switch 66), conductors $43^a$ and electro-magnet 48, and this energizes the electro-magnet 48. This magnet holds the foot or armature $40^c$ down in its operative position and the current now flows through the switch 44 and conductor 34 (the latter including the coil of the solenoid 25), then through the conductor 33 to the battery. It will also be seen that the current which now passes through the solenoid 25 energizes this solenoid and causes it to pull the crank 21 down, or turn this crank through a quarter of a revolution. This, obviously turns the indicating device 10 horizontally so that its pointer 20 is at the left side of the automobile and points to the left, while its red lens 19 is also disposed at the left side of the automobile, thereby indicating, by day or night, that the automobile is about to turn toward the left. However, if the automobile is about to turn to the right, the operator presses the key 42 so as to operate a switch mechanism 49 which is interposed between the conductor 36 and the conductor 35ª, the latter being a branch of the conductor 35. This switch mechanism is constructed like the switch mechanism 44, but its parts are designated by different reference characters, for the sake of clearness, and comprises switch arms or contacts 45ᵇ and 47ᵇ. When the armature 42ᶜ of the key 42 presses the switch arm 45ᵇ against the fixed contact 47ᵇ, this closes the circuit between the conductors 33ª and 36, through the medium of the electro-magnet 48′ (which is interposed in this latter conductor), and the current, in passing through the conductor 36, energizes the solenoid 27 and then passes through the conductor 33 to the battery 32. The electro-magnet 48′, now being energized, holds the key 42 in its operative position. Obviously, the solenoid armature 31 now turns the crank 22 through a quarter revolution, and this causes the signaling element 10 to point toward the right, thereby shifting the red lens 19 to the right.

Now, it is desired to automatically release the signaling device during the turning operation, so that it stands at normal after the turn has been made. This automatic releasing of the signaling element is effected by means of the steering wheel through the medium of the steering post or shaft 50, arms 51 and 51ª being secured on the steering post, preferably by means of a clamping band 52. These arms contact respectively with one or the other of two levers 53 and 54 which are pivotally connected at 55 and actuate a make-and-brake mechanism which includes two switch arms 56, fixed contacts 57, and two springs 58. The springs 58 normally hold the contacts of the switch arms 56 against the contacts 57, and a pair of springs 59 constantly hold the levers 53 and 54 in contact with the switch arms 56. However, these springs 59 are not sufficiently strong to overcome the springs 58. From the foregoing it will be obvious that when the steering post is turned through a considerable angle during the turning of an automobile around a curve, after the signaling element has been moved into its horizontal position by pressing the key 40 (for instance) the arm 51 will contact with the lever 53 and move the corresponding switch arm away from the adjacent fixed contact; or else, the arm 51ª will cause the lever 54 to open the circuit by moving the contiguous arm 56 away from its corresponding fixed contact. Now, referring again to Fig. 1, it will be seen that this operation of the switch mechanism 33ᵇ opens the main circuit, thereby deenergizing the magnet 48 and allowing the springs 40ᵈ to return the depressed key 40 to its normal position, thereby allowing the switch 44, which has been closed by this key, to be opened by means of its spring arm 45. Moreover, by thus breaking the circuit, the solenoid which has been holding the signaling element in its operative position is now deenergized, so that the heavier end of the signaling element gravitates into the position shown in Figs. 3 and 4, and this position indicates that the automobile is to continue its straight course after the turn has been made.

When it is desired to indicate that the automobile is about to stop, the crank 23 is swung through half a revolution so as to bring the pointer 20 into a depending or downwardly pointed position. This is accomplished by the armature 30 through the medium of the coil 26 and its connections with the storage battery 32. The conductor 35 which connects with this solenoid has therein a switch 60 and a magnet 61. The switch 60 and magnet 61 are identical in construction with the switch mechanisms illustrated in connection with the keys 40 and 42, and the armature 43ᶜ of the key 43 closes the switch 60 by pressing its switch arm 45ᶜ against the adjacent contact element 47ᶜ, and the electro-magnet 61 holds the adjacent armature 43ᶜ in its operative position. It will be seen, however, that the crank 23 normally stands on "dead center" with relation to the armature 30, and it is necessary, therefore, that the shaft 14 be moved from "dead center" position so that the armature 30 may pull the crank 23 down to its lowest position. For this purpose, we have chosen to employ the crank 21 and the solenoid which operates it. In this connection, it will be seen that a switch mechanism of peculiar and improved construction connects the conductor 34 with the conductor 35 through the medium of a conductor 62. This switch mechanism consists of a switch arm 63, preferably of spring material, and carrying two contact elements which make and break the circuit in connection with similar contact elements carried by spring arms 64 and 65. The contact element of the switch arm 63 is normally in closed circuit with the contact of the arm 64, but is moved into open circuit with the arm 64 and into closed circuit with the arm 65 by means of the armature 43ᶜ of the key 43. It will be seen, therefore, that this armature 43ᶜ simultaneously operates the contiguous switch arms 45ᶜ and 63. However, the contact elements of this pair of switches or compound switch mechanism are so related to one another that the adjacent armature or foot 43ᶜ first closes the circuit through the solenoid coil 25 by means of the switch arms 63 and 65, then closes the circuit between the contact elements of the switch arms 45ᶜ and 47ᶜ of this compound switch mechanism, and thereafter opens the circuit between the switch arms 63 and 64. Obviously, these steps in operating the compound switch are made possible by the spring action of the arms 63, 64 and 65, the latter following the former until it has closed the circuit with the arm 65, and then the arm 65 yields sufficiently to allow the arm 63 to move out of contact with the arm 64. Moreover, because of the downwardly converging foot 43°, the operator may press the key 43 only far enough to close the circuit between the arms 63 and 65 without opening the circuit between the arms 63 and 64. When the key 43 is thus partially depressed, the circuit is closed through the solenoid coil 25, conductors 34 and 62, a portion of the conductor 35, and the main conductor 33ª; whereupon the solenoid armature 29 moves the crank shaft 14 from its "dead center" position. Now, upon completing the depression of the key 43, the circuit is broken between the switch arms 63 and 64 and the solenoid coil 25 is deenergized, but the solenoid coil 26 has just previously been energized by the closing of the circuit 60, so that the armature 30 now takes control of the crank shaft and completes its movement through only half of a revolution, thereby inverting the indicating element from its normal position.

When the automobile has been stopped with the indicating element in the inverted or stop-indicating position, it is desired to return it to its normal position upon or before starting the automobile; but so long as the current flows through the coil 26, the armature 30 will hold the indicating device in this position, and it is necessary to release the key 43 from the control of the magnet 61. Of course, this could be done by pulling the key 43 outward, but its release is more quickly and easily accomplished by breaking the circuit and allowing its spring 43ᵈ to press it outward. For this purpose, and for the purpose of quickly and easily releasing any key which might have been depressed in error, we provide the key 41 which is similar in all respects to the keys 40 and 42. However, there is no magnet or other means for holding this key depressed, and its spring 41ᵈ immediately presses it outward when it has been released by the operator. A normally closed switch 66 is interposed between the conductors 33ª and 35, and is constructed like the switches 44, 49 and 60, the only difference being that this switch is normally closed as is the switch 63—64. A normally open switch 67 is connected to the conductors 34 and 43ª by means of conductors 68 and 69, and when the key 41 is depressed, its armature 41ᶜ first closes the switch 67, and then immediately opens the switch 66. This is made possible by the spring arm 47ª of the switch 66 following the switch arm 45ª of this switch until the switch arm 45′ of the switch 67 closes circuit with the arm 47′ of the switch 67. It will be seen, therefore, that when the circuit is thus closed, by the switch 67, when the indicating element is pointing downward, the current passes from the battery 32 through the conductors 33ª, 35, (the latter including the switch 66), conductor 68, switch 67, conductors 69, 34 and 33, to the battery 32; and this energizes the solenoid coil 25 and causes it to turn the shaft 14 so as to bring the crank 23 off of its lower "dead center" position, whereupon, the indicating device would be held in its horizontal position by the armature 29, until the key 41 is released, if it were not for the fact that the depressed key has now opened the switch 66, and has thereby opened the circuit, so that the weighted end of the indicating device moves the latter by its normal upwardly pointing position. Upon releasing the key 41, the spring action of the arms 45ª and 47ª of the switch 66 return them to their normally closed position, and the device is now again in position to be operated for indicating that the automobile is to be turned or stopped.

Although we have described this embodiment of our invention very specifically, it is not intended to limit this invention to these exact details of description and combination of parts, but we are entitled to make changes within the inventive idea disclosed in the foregoing description and following claims.

What we claim as our invention is:

1. In a signal, a signalling element, a crank shaft carrying said signalling element and comprising cranks set at right angles to one another, connecting rods journalled respectively to said cranks, one of said connecting rods extending in the radial direction of its correlated crank when said signalling element in its normal position, and means to selectively actuate said connecting rods in a manner to cause either a half revolution or only a quarter revolution of the crank shaft.

2. In a signal, a crank shaft comprising three cranks set substantially at right angles to one another, a signalling element carried by said crank shaft, connecting rods journalled respectively on said cranks, one of said connecting rods extending in the radial direction of its correlated crank when said signalling element in its normal position, and means to selectively actuate the connecting rods in a manner to cause either a half revolution of the crank shaft or cause only a quarter revolution of the crank shaft in either direction.

3. In a signal, a signalling element, a crank shaft carrying said signalling element and comprising cranks set diametrically opposite to one another, connecting rods directly connected respectively to said cranks, tubular members each pivotally mounted on the same axis and receiving one end of a corresponding one of said connecting rods, and means for causing said tubular members to move said connecting rods longitudinally therein, said means being operable to selectively actuate either of said connecting rods and thereby turn said crank shaft and signalling element through one quarter of a revolution in either direction.

4. In combination, a crank shaft adapted for connection with an object to be adjusted to different positions, said crank shaft comprising cranks extending in different directions from its axis; solenoids having their armatures journaled to said cranks respectively; electrical conductors correlated respectively with the solenoids and adapted to energize the latter; and a switch mechanism comprising a key and two switches, said switches being connected respectively to said conductors, said key being operable to first close one of said switches and then close the other of the switches and concomitantly hold them in their respective closed positions.

5. In combination, a crank shaft adapted for connection with an object to be adjusted to different positions, said crank shaft comprising cranks extending in different directions from its axis; solenoids having their armatures journaled to said cranks respectively; electrical conductors correlated respectively with the solenoids and adapted to energize the latter; and a switch mechanism comprising a key and a double-throw switch and a single-throw switch, said double-throw switch being connected to one of said conductors, and the single-throw switch being connected to the other of said conductors, said key being operable to first close said double-throw switch and then close said single-throw switch and then open the double-throw switch.

6. In an electric circuit, the combination of a main conductor including a normally closed switch; a pair of switches; an electro magnet in circuit with said main conductor and with one of the switches of said pair; a key comprising an armature and being operable to close said one of the switches of said pair and thereby energize said magnet and then open the other switch of said pair, said armature being cooperative with said magnet to hold the pair of switches respectively closed and open; means to return said key to its inoperative position when it is released by said magnet; electric motors connected in parallel through the respective switches and main conductor; a shunt about said pair of switches and including a normally open switch, said shunt being in circuit with only one of said electric motors; and a key operable to close said normally open switch and thereafter open said normally closed switch and thus energize said one of the electric motors and de-energize said magnet and thus allow the first said key to return to its inoperative position.

In testimony whereof we have hereunto set our hands.

MONTAGUE R. BATER.
NIELS P. SVENDSEN.
DAVID T. TRUMP.
RICHARD M. MAHONEY